Aug. 27, 1963
M. D. JENNINGS
3,101,788
TWO-WAY DISK PLOW
Filed Jan. 2, 1962
FIG. 1
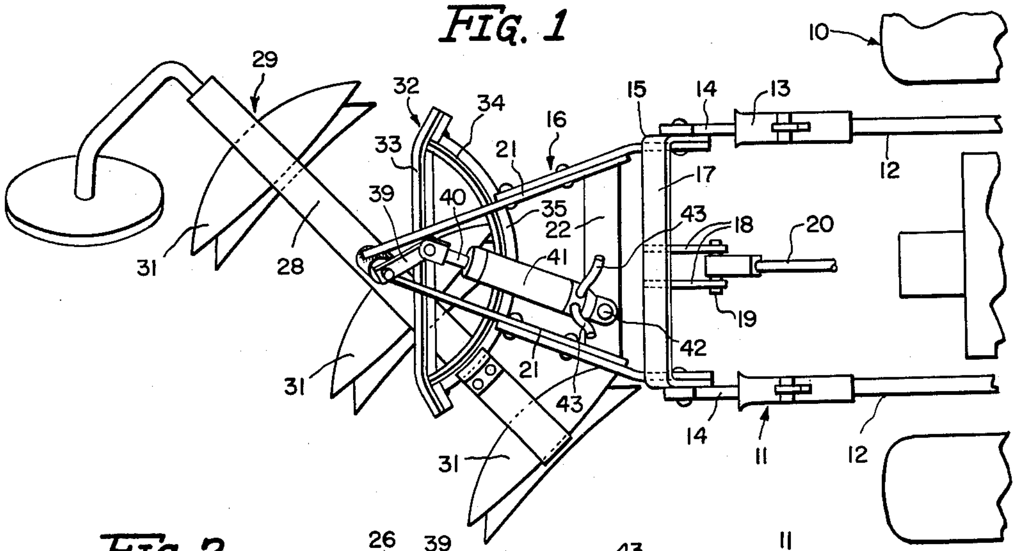
FIG. 2
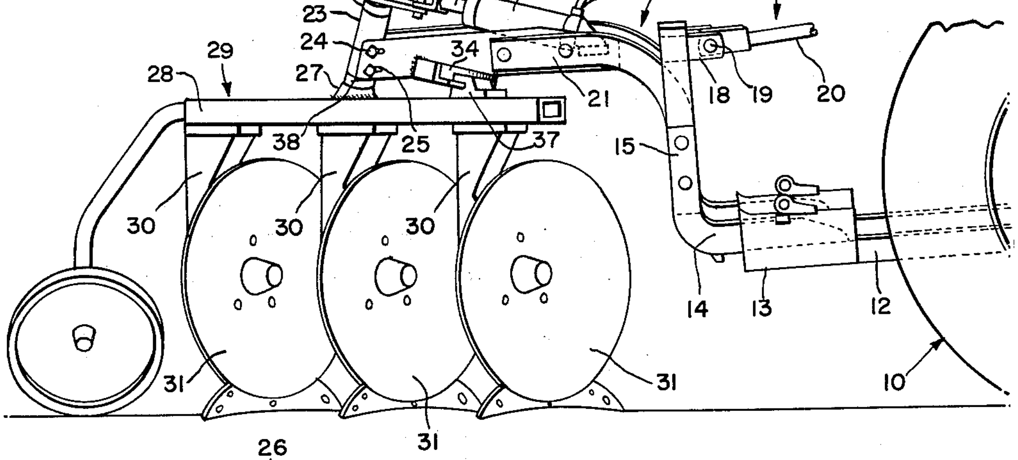
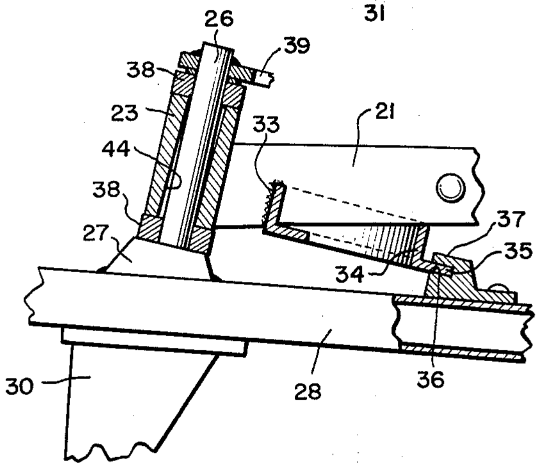
FIG. 3
INVENTOR.
Marvin D. Jennings
BY Paul O. Pippel
Atty.

United States Patent Office 3,101,788

Patented Aug. 27, 1963

3,101,788
TWO-WAY DISK PLOW

Marvin D. Jennings, Naperville, Ill., assignor to International Harvester Company, Chicago, Ill., a corporation of New Jersey Filed Jan. 2, 1962, Ser. No. 163,746
6 Claims. (Cl. 172—219)

This invention relates to agricultural implements and particularly to plows. More specifically the invention concerns a reversible or two-way plow.

An object of the invention is the provision of a reversible plow of novel construction and improved operating characteristics, and particularly adapted for mounting on a tractor to be transported thereby.

Another object of the invention is the provision of a novel two-way or reversible implement such as a disk plow of the type wherein the disk carrier is disposed diagonally of the direction of travel and is swung laterally to the opposite diagonal for alternate right and left-hand plowing.

Another object of the invention is the provision of a novel disk plow or the like having a tool carrier that is laterally shiftable to opposite diagonals for right and left-hand plowing, wherein the pivot means connecting the carrier to the supporting frame is at such an angle to the vertical that the forward end of the tool carrier follows an arcuate path, in its lateral movement, in a forwardly and downwardly inclined plane.

Other objects and advantages of the invention will become clear from the following detailed description when read in conjunction with the accompanying drawings, wherein:

FIGURE 1 is a plan view of the rear end of a tractor having mounted thereon a reversible disk plow incorporating the features of this invention, and illustrating the right-hand plowing position of the implement;

FIGURE 2 is a view in side elevation of the structure shown in FIGURE 1, and

FIGURE 3 is an enlarged sectional detail of the means by which the disk carrier is mounted on the supporting frame, the position of the parts representing a neutral transport position of the implement with the tool carrier substantially on the center line of the supporting frame and parallel to the direction of travel.

Referring to the drawings, the numeral 10 designates a tractor having mounted thereon lifting apparatus including a hitch structure 11 adapted to be raised and lowered by means, not shown, deriving power from the tractor.

The tractor hitch and lifting structure 11 includes a pair of laterally spaced parallel draft bars 12 having elongated socket member 13 secured to their rear ends and in which are slidably received laterally spaced shaft elements 14 at the lower ends of a yoke 15 forming part of a plow supporting frame 16. Yoke 15 has a transverse section 17 to which are affixed a pair of lugs 18 carrying a pivot pin 19 which is connected to the rear end of an upper hitch link 20 triangularly arranged with respect to the lower draft links 12 and forming part of the three-point hitch structure 11 of the tractor.

The supporting frame 16 of the plow also includes a pair of rearwardly converging frame bars 21, the forward ends of which are connected by a cross brace 22 and the converging rear ends of which straddle and are affixed to a bearing or sleeve member 23 carrying bolts 24 projecting laterally therefrom and adjustably receivable in slots 25 formed in the bars 21. Sleeve 23 rotatably receives an upwardly projecting spindle or pivot pin 26, the lower end of which is affixed to a boss 27 mounted on the rectangularly shaped beam 28 of a tool carrier 29.

In the operating position of FIGURES 1 and 2 the elongated beam 28 extends diagonally of the direction of travel, and the boss 27 and spindle or pivot pin 26 are affixed thereto medially of its ends. Standards 30 are secured to and depend from the beam 28 of the tool carrier, and disking tools 31 are secured to the lower ends of the standards. These disking tools face diagonally in the direction of beam 28 and are disposed for right-hand plowing.

The pin or spindle 26 is tilted at an angle from the vertical forwardly in the plane of beam 28, as shown clearly in FIGURE 1, and is rotatable in sleeve 23 to accommodate lateral swinging or shifting of the tool carrier 29 to the opposite diagonal for left-hand plowing when the direction of operation in the field is reversed. Due to this forward tilt, tool beam 28 swings from an operating position in which it is substantially horizontal, as shown in FIGURE 2, to the alternate left-hand operating position where the tool beam is again substantially horizontal, the forward end of the beam moving in an arcuate path in a forwardly and downwardly inclined plane due to its swinging about the forwardly tilted axis of spindle 26.

The tool carrier is guided in this lateral swinging from one operating position to another by a guide member 32 comprising a transversely extending brace 33, affixed to frame bars 21 and an arcuately shaped track section 34 disposed in a forwardly and downwardly inclined plane as shown in FIGURES 2 and 3. Track section 34 of the guide includes an outwardly directed flange 35 slidably received in a notch 36 formed in a lug 37 mounted on the beam 28 near its forward end. The cooperation of flange 35 with lug 37 thus supports, guides and stabilizes the disk carrier in its shifting from one operating position to another and in the central transport position represented in FIGURE 3 wherein the tool beam 28 is parallel to the direction of travel and the plow has been lifted above the ground for transport.

A pair of collars 38 are mounted on spindle 26 at each end of the sleeve 23, and to the upper end of the spindle is affixed one end of a lever 39, the other end of which is pivotally connected to a piston rod 40 slidable in a hydraulic cylinder 41 pivotally connected at 42 to cross-brace 22 and adapted to receive fluid under pressure through hose lines 43 from a source of fluid under pressure, not shown, provided on the tractor. The tool carrier 29 is shifted alternately from one operating position to the other by extension and retraction of piston rod 40 in cylinder 41.

The operation of levelling the plow in its operating positions, which occurs in conventional plows, is minimized in the present construction. Variation in the depth of operation of the earthworking tools 31 requires adjustment in the angular relationship between tool carrier 29 and supporting frame 16, and this is accomplished by forming the internal bore 44 of sleeve 23 as an eccentric and angularly adjusting it with respect to spindle 26, the parts being held in a selected adjusted position by tightening bolts 24 in slots 25 of the frame.

It is believed that the construction and operation of the novel reversible disk plow of this invention will be clearly understood from the foregoing description. It should likewise be understood that the invention has been described in its preferred embodiment only and that modifications may be made therein without departing from the spirit of the invention or the scope of the appended claims.

What is claimed is:

1. In a reversible disk plow, a supporting frame, an elongated disk carrier extending diagonally of the direction of travel and substantially parallel to the ground in the operating position of the carrier, a pivot member affixed to and projecting upwardly from the disk carrier medially of its ends, said pivot member being tilted forwardly in the plane of the carrier and at an angle with respect thereto, and means connecting said pivot member to the supporting frame for lateral swinging of the carrier about the axis of said pivot member between opposite diagonals for right and left-hand plowing.

2. The invention set forth in claim 1, wherein guide means is mounted on the frame in the form of an arcuate track disposed in a forwardly and downwardly inclined plane at an angle with respect to the carrier and a complementary guide member mounted on the forward portion of the carrier cooperatively engages said track.

3. In a reversible plow adapted for mounting upon a tractor having lifting mechanism thereon, a supporting frame connected to said lifting mechanism to be raised and lowered thereby, a plow carrier extending diagonally of the direction of travel substantially parallel to the ground in the operating position of the plow, and means connecting the plow carrier to the frame for lateral swinging between opposite diagonals for right and left-hand plowing, including pivot means tilted forwardly at an angle with respect to the carrier and the ground in said operating position of the plow and acocmmodating said lateral swinging about a forwardly inclined axis.

4. The invention set forth in claim 3, wherein said pivot means comprises a spindle mounted on and projecting upwardly from the plow carrier at a forward angle in the plane of the carrier, and an axially bored sleeve member mounted on the supporting frame rotatably receives said spindle.

5. The invention set forth in claim 3, wherein means are provided in the connection of the plow carrier to the supporting frame to angularly adjust the carrier relative to the frame to compensate for variations in operating depth of the plow.

6. The invention set forth in claim 4, wherein the bore in said sleeve member is eccentric to its axis and means are provided for angularly adjusting the sleeve member relative to the spindle.

References Cited in the file of this patent

UNITED STATES PATENTS 2,648,267 Pursche ---------------- Aug. 11, 1953

FOREIGN PATENTS 18,176 Australia ---------------------- of 1929

103,796 Australia --------------- Apr. 22, 1938